(12) United States Patent
Heurlin et al.

(10) Patent No.: US 7,905,515 B2
(45) Date of Patent: Mar. 15, 2011

(54) METHOD AND APPARATUS FOR PRE-IMPACT DEPLOYMENT OF AIR BAG

(75) Inventors: Fredrik Heurlin, Torslanda (SE); Peter Hardå, Göteborg (SE); Mark A. Cuddihy, New Boston, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 12/425,787

(22) Filed: Apr. 17, 2009

(65) Prior Publication Data
US 2009/0261561 A1    Oct. 22, 2009

(30) Foreign Application Priority Data

Apr. 18, 2008   (EP) .................................. 08154800

(51) Int. Cl.
*B60R 21/16*   (2006.01)
(52) U.S. Cl. ........................................ 280/735
(58) Field of Classification Search ................. 280/735, 280/743.2; 701/45
See application file for complete search history.

(56) References Cited

U.S. PATENT DOCUMENTS

| | | | |
|---|---|---|---|
| 6,454,300 B1 | 9/2002 | Dunkle et al. | |
| 7,584,036 B2 * | 9/2009 | Roelleke | 701/45 |
| 7,695,014 B2 * | 4/2010 | Parks et al. | 280/743.2 |
| 2002/0158456 A1 | 10/2002 | Fischer | |
| 2006/0214398 A1 * | 9/2006 | Fredin et al. | 280/728.2 |
| 2007/0246924 A1 | 10/2007 | Eckelberg | |
| 2008/0203716 A1 * | 8/2008 | Parks et al. | 280/743.2 |

FOREIGN PATENT DOCUMENTS

| | | |
|---|---|---|
| WO | 2006-101588 A2 | 9/2006 |
| WO | 2006-102432 A2 | 9/2006 |

\* cited by examiner

*Primary Examiner* — Faye M. Fleming
(74) *Attorney, Agent, or Firm* — Frank A. MacKenzie; Brooks Kushman P.C.

(57) ABSTRACT

An air bag deployment system includes a pre-impact sensor operative to detect an imminent impact and at least one post-impact sensor operative to detect an impact. An air bag has a non-deployed volume, a pre-impact deployed volume, and a post-impact deployed volume smaller than the pre-impact deployed volume. The air bag is deployed to the pre-impact volume wherein the air bag deployment system is arranged to deploy the air bag before the impact and the at least one air bag is deployed into the pre-impact deployed volume, in reaction to the imminent impact, and to the post-impact deployed volume in reaction to the impact. The system provides for enhanced occupant safety during a collision by allowing pre-impact deployment of the air bag in order to utilize the full possible length of deceleration for the occupant as the impact pulse affects the occupant.

14 Claims, 2 Drawing Sheets

METHOD AND APPARATUS FOR PRE-IMPACT DEPLOYMENT OF AIR BAG

CROSS-REFERENCE TO RELATED APPLICATIONS

This application claims foreign priority benefits under 35 U.S.C. §119(a)-(d) to EP 08154800.0 filed Apr. 18, 2008, which is hereby incorporated by reference in its entirety.

BACKGROUND

1. Technical Field

The present invention relates to an air bag deployment system for a vehicle and a method for pre-impact deployment of the air bag.

2. Background Art

Air bag systems are widely used in the vehicle industry and have provided vehicle occupants with enhanced safety for the last decades. In an automotive vehicle it is common to position air bags in the hub of the steering wheel, in a recess in the instrument panel, in the seats, and/or in the door panels or in the A, B and C pillars. Other positions are of course also possible. In any mounting positions, the air bag is required to inflate very fast and at the correct moment.

Air bags are usually in fluid communication with a gas emitting inflator, which in turn is generally in electrical communication with an impact sensor. During e.g. a frontal collision between two vehicles, the sensor, e.g. an accelerometer, detects a very rapid deceleration immediately after the vehicle impacts another object, such as another vehicle or a fixed object. The collision generates an impact pulse which runs through the vehicle; as a consequence, occupants are thrown in the forward direction. Upon detection of the impact, the impact sensor triggers the gas emitting inflator to inflate the air bag, which restrains and cushions the occupant. It has been found that the inflation of the air bag may be varied depending upon the severity of the collision; such a system is disclosed in U.S. Pat. No. 6,454,300 B1. The system comprises a release mechanism to hold restraining air bag tethers, which can be selectively released at a predetermined condition to provide an air bag of varying size depending on the severity of the collision.

As mentioned above, an occupant is thrown forward during a frontal collision due to the impact pulse imparted by the impact. To minimize or prevent injuries to the occupants during a collision it is vital that the peak level of deceleration experienced by the occupant be kept as low as possible. The patent publication referred to above provides a system for varying the size of the air bag depending on the severity of the collision. Another air bag system, similar to the one referred to above, is disclosed in US 2007/0246924 A1. The air bag system utilizes releasable tethers which can be released at a predetermined condition. Both the documents above utilize impact sensors which detect the occurrence of an impact. Additionally in US 2007/0246924 A1, the system can be complemented with seat position sensors, an occupant position sensor, a seatbelt usage sensor or a seat weight sensor. All sensors are used to provide a degree of inflation of the air bag intended to minimize the sudden deceleration of the occupant during collision.

During a normal collision using systems as described above, an occupant's head moves about 120-130 mm (about 5 inches) from the moment of impact to the moment when the air bag is fully deployed. Further, the general deployment time of an air bag is about 30 ms (milliseconds). This ratio is also known as the 5/30 rule within the industry. Considering that the general total deceleration distance for an occupant, e.g. in the driver's seat, is about 450 mm of which only 300 mm up to this date is used, there remains a need for further improved methods and systems which soften the deceleration of the occupant and increase the deceleration distance of the occupant during impact to minimize personal injuries.

SUMMARY

The air bag deployment system disclosed herein comprises at least one pre-impact sensor operative to detect an imminent impact, at least one post-impact sensor operative to detect an impact at the time of or after it has occurred, and at least one air bag having a non-deployed volume, a pre-impact deployed volume, and a post-impact deployed volume. The pre-impact deployed volume is larger than the post-impact deployed volume, and the two volumes are adapted to provide an occupant with a desired distance and rate of deceleration appropriate for the conditions of the impact.

The disclosed air bag deployment system is operative to activate the air bag to the pre-impact deployment volume in reaction to detection of an impending impact by the pre-impact sensor, and is further operative to activate the air bag to the post-impact deployed volume in reaction to detection of the impact by the post-impact sensor. The disclosed system provides for a safe air bag system which gives an occupant a longer deceleration distance during an impact, mainly because the air bag is provided with a larger volume than that which is practically possible when deploying an air bag post-impact. Thereby less impact pulse is imparted to the occupant.

By taking into account that an occupant, before impact, has not yet been affected by the impact pulse, the air bag deployment volume can be larger than that which is practically possible when the air bag is deployed post-impact. The occupant's safety is thereby enhanced.

In these embodiments of the present invention, the effects of a pre-impact deployment can be combined with the effects and safety of a post-impact deployment of at least one air bag. This is specifically advantageous since imminent impacts may not be detected with sufficiently high accuracy, and a post-impact deployment system functions as a back-up system if the pre-impact deployment fails or is not detected with sufficiently high accuracy for some reason.

In an embodiment according to the present invention, the pre- and post-impact deployed volume is regulated by means of a releasable restraining device. The releasable restraining device is arranged to restrain the air bag from reaching the pre-impact deployed volume, especially during a post-impact deployment. The releasable restraining device is optionally arranged to be released before impact, so that the at least one air bag can be deployed into the pre-impact deployed volume following the pre-impact deployment. An example of the releasable restraining device is at least one releasable tether. By using releasable restraining devices predictable pre- and post-impact deployed volumes can be provided, although alternatively, the pre- and post-impact deployed volumes can be provided by other means, such as by inflating the air bag with different amounts of gas. In such a case a two step gas generator can be used. The pre- and post-impact deployed volumes can also be regulated by means of active ventilation of the air bag.

According to a further embodiment to the invention, the pre-impact sensor may be at least one of a radar sensor (such as a forward long range radar sensor), a cameras (such as a high resolution digital imaging recorder), or a laser sensor (such as closing velocity laser sensor). These sensors are known per se and will not be described in greater detail. These sensors have been found to be reliable, but even more importantly, it has been found that they complement each other; hence, it is well within the boundaries of the present invention that the above mentioned pre-impact sensors are combined and used together.

The air bag deployment system can further comprise a processing unit. The processing unit, such as a computer, e.g. an on-board vehicle computer or the like, and the pre-impact sensor and post-impact sensor, or any other sensor if such is present, are arranged in working cooperation with the at least one air bag. The processing unit actuates the deployment of the air bag by analyzing the inputs from each sensor and thereby possibly detects a scenario at which the at least one air bag should be deployed. Such a scenario can be an imminent impact, which would trigger the processing unit to deploy the air bag to its pre-impact deployed volume. By using a processing unit, pre-determined scenarios can be detected. The processing unit can for instance be programmed to detect a specific scenario, at which an imminent impact can be determined with a very high accuracy, such as a frontal collision with another vehicle. It has been found that this is very advantageous since it increases the accuracy with which imminent impacts may be detected. Although the system is described and depicted as having only one processing unit, it is well within the boundaries of the present invention to use more than one processing unit. The processing units can be connected together or act as separate units towards e.g. specified sensors and/or selected air bags.

Additional sensors can be connected to the air bag system. For instance, an additional sensor may be an accelerometer, a roll over sensor, a brake sensor, or an occupant positioning sensor (such as a seatbelt usage sensor, seat positioning sensor or vision system). By adding these kinds of sensors, the probability for a correct, and thereby successful, pre- or post-impact deployment of an air bag can be more accurately determined, especially when combined with a processing unit as described above.

According to another aspect of the present invention, a method for operating an occupant protection system for a vehicle comprises the steps of: operating at least one pre-impact sensor and at least one post-impact sensor; deploying at least one air bag to a pre-impact deployed volume if an imminent impact is detected by the at least one pre-impact sensor; and deploying the at least one air bag to a post-impact deployed volume smaller than the pre-impact deployed volume if an impact is detected by the at least one post-impact sensor prior to detection of the imminent impact by the pre-impact sensor.

In an embodiment of the present invention, the method further comprises the step of: releasing a releasable restraining device to enable the at least one air bag to be deployed into the pre-impact deployed volume. Such a releasable restraining device can be at least one releasable tether, however, more accurate shaping of the air bag can be provided if two or more tethers are used. By using this kind of mechanical control of the air bag deployment volume, it has been found that very reliable results are achieved. Alternative methods are however possible such as using a different amount of inflation gas when inflating to the pre-impact deployed volume or the like.

The air bag deployment system can further comprise a processing unit and the method further comprises the step of: determining the probability of an imminent impact by taking into account a pre-programmed scenario, the determined probability of an imminent impact being the basis for the pre-impact deployment of the air bag. This step enhances the probability of a correct determination and thereby a correct deployment of the air bag into the pre-impact deployed volume.

When the air bag deployment system comprises a pre-impact sensor system comprising a long range radar sensor and a camera, the method can further comprise the steps of; detecting a radar echo by means of the long range radar sensor to determine an approaching object's speed and distance; determining the type and size of the object by means of the camera; processing the output of the long range radar sensor and the camera in the processing unit; and determining if the condition for deployment of the air bag into the pre-impact deployed volume is fulfilled or not.

Additionally, a laser sensor, preferably a closing velocity laser sensor, can be connected. By using the laser sensor, a more accurate determination of the speed and distance of an object on a collision course can be made. When an object is within reach of the laser sensor the measurements of the long range radar sensor can be replaced by the measurements of the laser sensor.

BRIEF DESCRIPTION OF THE DRAWINGS

The present invention will be described in greater detail with reference to the accompanying Figures, wherein.

DETAILED DESCRIPTION

Figure 1A:
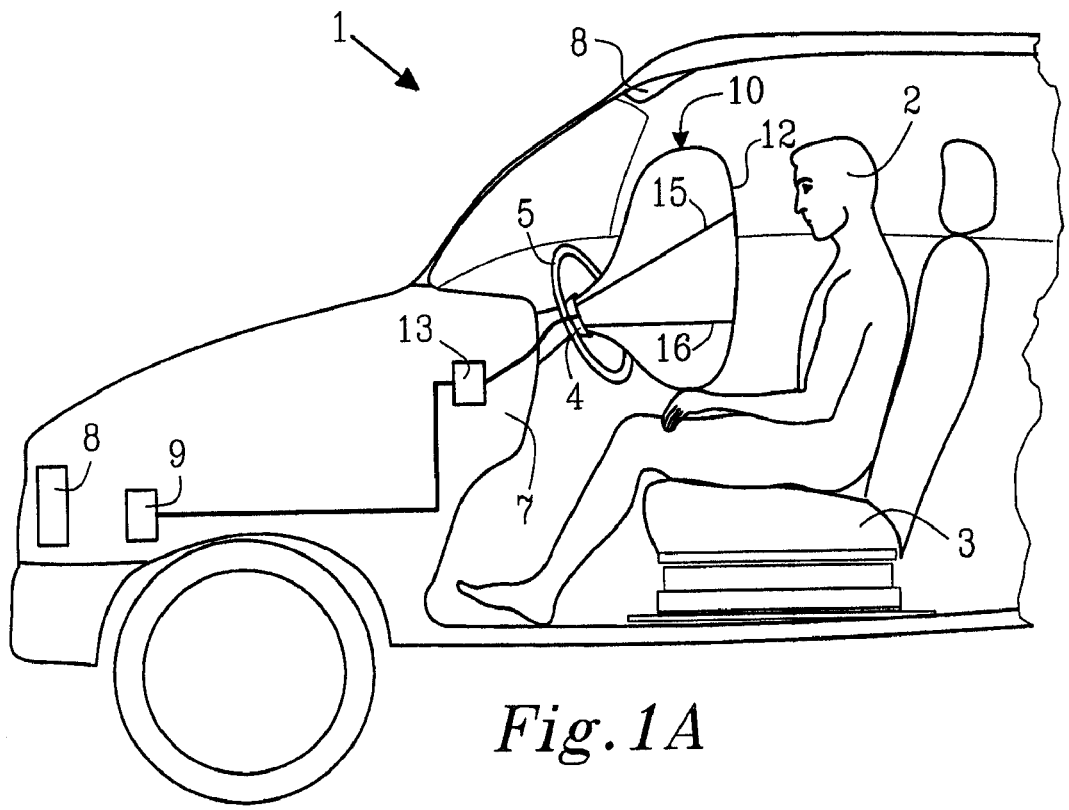
FIG. 1A shows a schematic cross section of a vehicle with a view from the side, an air bag deployment system is shown deployed into a post-impact deployed volume just after impact.
Figure 1B:
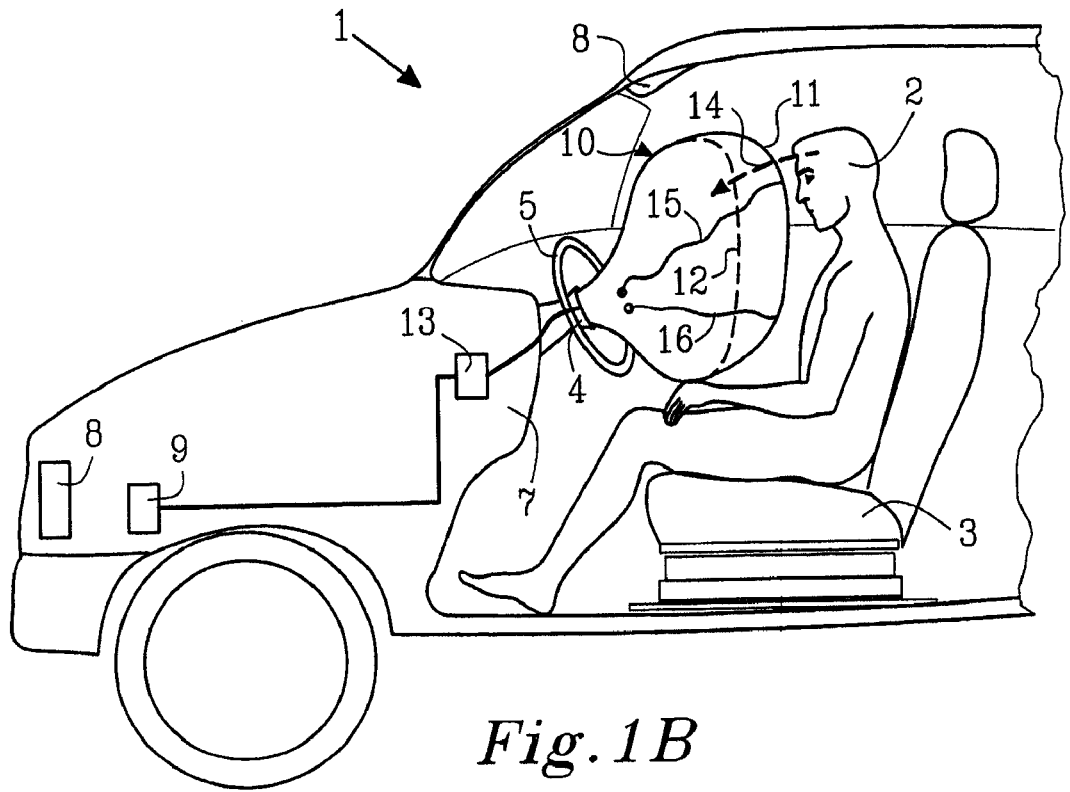
FIG. 1B shows a schematic cross section of a vehicle with a view from the side, an air bag deployment system is shown deployed into a pre-impact deployed volume just before an imminent impact.

FIGS. 1A-1B shows a schematic cross section of a vehicle 1 just after deployment of the air bag 10 into a specified deployment volume 11, 12. The deployment volume can be a post-impact deployment, as illustrated in FIG. 1A, or a pre-impact deployment, as illustrated in FIG. 1B, dependent on the detected scenario, as will be clear when reading this description. FIGS. 1A-1B shows an occupant 2, in this case the driver of the vehicle 1, positioned in the driver seat 3. The air bag is deployed from the hub 4 of the steering wheel 5, positioned in the instrument panel 7 of the vehicle 1. A pre-impact sensor system 8 and a post-impact sensor 9 are arranged in working cooperation with the air bag 10. In the shown embodiment of the present invention, a processing unit 13 is arranged to actuate the deployment of the air bag 10. As is showed, only one air bag 10 is deployed, however, it is well within the boundaries of the present invention that more than one air bag is deployed simultaneously or sequentially, e.g. 2, 3, 4, 5 or more air bags associated with any number of seating positions can be deployed pre-impact and/or post-impact.

The air bag 10 has a pre-impact and a post-impact deployed volume 11, 12; the post-impact deployed volume 12 is indicated with dotted lines in FIG. 1B. Before deployment (not shown) the air bag has a non-deployed volume, in practice, this volume is very small since the air bag is completely deflated and snugly fitted in the hub 4 of the steering wheel 5, or other location. The pre-impact deployed volume 11 is adapted for deployment before the vehicle collides, i.e. pre-impact. As the air bag 10 is deployed pre-impact, the air bag volume can be significantly larger than the volume of an air bag which is deployed after impact, i.e. post-impact. In the shown embodiment of the present invention, this is equivalent with the post-impact deployed volume 12 of the air bag 10, as illustrated in FIG. 1A. Since the pre-impact deployed volume 11 is larger than the post-impact deployed volume 12, the occupant 2 has a significantly longer deceleration distance, indicated by the dotted line with the reference number 14 in FIG. 1B, during the impact.

Deployment of the air bag 10 to the pre- and the post-impact deployed volumes 11, 12 is, in the shown embodiment of the present invention, controlled by means of a releasable restraining device in the form of two releasable tethers 15, 16. As seen in FIG. 1B, the releasable tethers 15, 16 have been released from their attachment position to the hub 4 of the steering wheel 4. In contrast, as seen in FIG. 1A, in which the releasable tethers 15, 16 are still connected to the hub 4 of the steering wheel 5.

When an imminent impact is detected by the pre-impact sensor system 8, the pre-impact sensor system 8 triggers the inflation of the air bag 10 and releases the tethers 15, 16 at the moment of inflation, so that the air bag 10 can be deployed to the pre-impact deployed volume 11 which is adapted for a pre-impact deployment. A pre-impact deployment of the air bag 10 utilizes the fact that the occupant and the vehicle have not yet been affected by the impact pulse imparted by the impact of the vehicle; hence the air bag can be inflated to a larger volume. The occupant 2 is hence protected during the actual impact by an air bag which provides a longer deceleration distance for the occupant 2 as compared with an air bag which is deployed after impact.

The air bag 10 can have several different configurations to meet the requirement of having a pre- and a post-impact deployed volume. For instance, the air bag 10 can be arranged with releasable tethers 15, 16 as shown in FIGS. 1A-1B. The specific release mechanism of the releasable tethers can be pyrotechnical or optionally as described in US 2007/0246924 A1. As an alternative it is possible that the air bag system comprises a first air bag which is deployable into a pre-impact deployed volume, and a second air bag which is deployable into a post-impact deployed volume, the first air bag is deployed before impact. The first air bag is adapted for a pre-impact deployment while the second air bag is adapted for a post-impact deployment.

Figure 2:
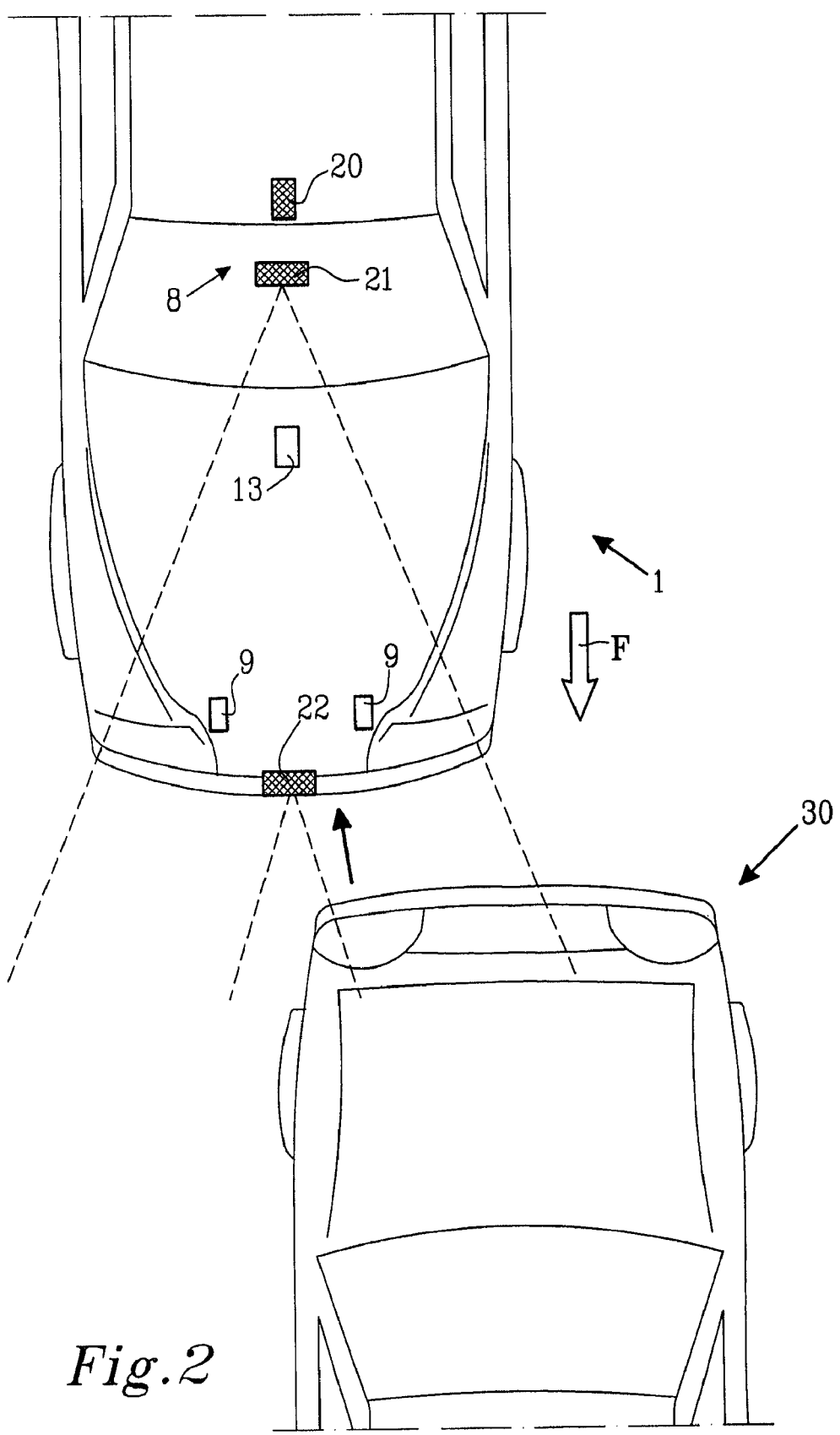
FIG. 2 shows a schematic top view or a first and a second vehicle on a collision course.

FIG. 2 shows the vehicle 1 as seen from above with a view towards the roof of the vehicle 1. The vehicle 1 is driving in the direction F meeting an object, in this non-limiting example, a second vehicle 30 driving in the opposite direction of the direction F is on a collision course with the vehicle 1. The pre-impact sensor system 8 comprises a camera 20, a laser sensor 21, such as a closing velocity laser sensor, and forward looking long range radar 22. The sensor system 8 communicates with the processing unit 13 using a wireless technique e.g. blue tooth, WLAN or the like, and/or optionally via conventional wires.

The function and methodology of the present invention will be described hereafter in greater detail with reference to the non-limiting example illustrated in FIG. 2.

As seen in FIG. 2, the vehicle 1 and the second vehicle 30 are approaching each other substantially head on, on a collision course. When the distance between the vehicle 1 and the second vehicle 30 is relatively large, for example approximately 100 meters (m), the forward looking long range radar 22 detects a radar echo from the vehicle 30. From the detection of the radar echo from the vehicle 30, the forward looking long range radar 22 tracks the vehicle 30, keeping the vehicle 30 under surveillance. When the vehicle 1 and the vehicle 30 are separated by a threshold distance, for example approximately 50 m, the camera 20 detects the vehicle 30 and starts tracking the vehicle 30 optically using image processing algorithms of the type well known in the art. The radar echo and the image identified by the camera 20 are merged to define a target, equivalent to the vehicle 30, which is tracked towards the vehicle 1.

In this scenario, the forward looking long range radar 22 provides values of the vehicle's 30 speed and distance while the camera 20 detects the type of object, in this case a vehicle, and/or the size of the vehicle 30. To more accurately detect whether an impact is imminent, a laser sensor 21 can be provided with the air bag system. The laser sensor 21 uses a relatively high frequency, for example approximately 100 Hz, while the forward looking long range radar 22 uses a relatively lower frequency, for example approximately 10 Hz. It has been found that a higher measuring frequency is beneficial as the distance between the vehicle 1 and the target object decreases. The lower frequency of the camera is generally due to complex imaging processing.

When the laser sensor 21 detects the vehicle 30, the higher resolution range and velocity data from the laser sensor may partially or completely replace the input signal received from the forward looking long range radar 22, thereby providing the processing unit 13 with a more accurate measurement of the distance and speed of the vehicle 30. This permits the processing unit 13 to predict a possible impact and the time-to-impact more accurately.

The processing unit 13 executes an algorithm for determining whether to activate (i.e. inflate) any air bags, which air bags and when to activate them. The embodiment of the present invention is illustrated with the inflation of one frontal air bag arranged in the hub of the steering wheel only, as shown in FIGS. 1A-1B. However as mentioned above, additional air bags can be deployed, and the additional air bags may be located in any position within the vehicle 1. The processing unit 13 determines whether the probability for an imminent impact is sufficiently high for a pre-impact deployment of the air bag and thereby deployment into the pre-impact deployed volume 11, as illustrated in FIG. 1B, based on the signals received from the pre-impact sensor system 8, in this case, input from the forward looking long range radar 22, the camera 20 and the laser sensor 21.

In the event that the air bag system is unable to adequately predict a possible pre-impact scenario, the air bag system is preferably provided with post-impact sensors 9, which also communicate with the processing unit 13. If the processing unit 13 cannot with a high accuracy predict an imminent impact, the processing unit 13 will not deploy the air bag 10 into the pre-impact deployed volume 11, since such a deployment may not provide the optimum level of protection to the occupant. If the processing unit 13 determines that the probability of an imminent impact is too low for a pre-impact deployment of the air bag 10, the processing unit 13 awaits the input from the post-impact sensors 9.

In an embodiment of the present invention, both pre-impact sensor systems and post-impact sensor systems can be used. They may further be used as separate systems to determine whether to inflate any air bags or optionally they can be used simultaneously.

The processing unit 13 can, for instance, be a computer. As such it can be programmed to recognize different inputs from each sensor 8, 9, 20, 21, 22. By means of programming the processing unit 13, different scenarios can be preprogrammed and the processing unit 13 can be arranged to detect such a programmed scenario by running a suitable algorithm. As an example, a frontal collision with a vehicle can be programmed and the sensors can thereby detect a real scenario that the processor matches with a pre-programmed scenario, to thereby detect and predict such an event with a higher accuracy than would otherwise be possible simply by determining an imminent impact by means of only the signals from the pre-impact sensors.

In this non-limiting example, a prerequisite for inflating the air bag in a pre-impact scenario is that all of the pre-impact sensors are activated to provide measurements of an approved target. In this case all three sensors, i.e. the forward looking long range radar 22, the camera 20 and the laser sensor 21, have been activated to provide an approved target. Optionally, an additional prerequisite can be that the sensors have been activated in a specific order, preferably in the order of: the forward looking long range radar 22, followed by the camera 20, followed by the laser sensor 21.

When using a pre-impact sensor system and a post-impact sensor system simultaneously, air bags can be deployed pre-impact, when the probability of an imminent impact has been determined as sufficiently high by a processing unit based on the input(s) from a pre-impact sensor system. After impact, the post-impact sensor system detects the impact and deploys post-impact air bags.

The processing unit 30 may further receive inputs from other sensors related to vehicle dynamics and performance. For example brake sensors and/or e.g. accelerometers, which are arranged to detect whether the vehicle is under heavy deceleration e.g. during an emergency brake application. Inputs from such additional sensors may increase the accuracy of the estimation of the probability of an impending impact. Additional sensors, whose input can be utilized in the same manner, can be vehicle rollover sensors, such as a gyroscopic sensor. The air bag system may also be connected with occupant positioning sensors such as seatbelt usage sensor, seat positioning sensor, a vision system for the occupant position with respect to the instrument panel etc.

It is also within the boundaries of the present invention to use active ventilation to control the flow of inflation gasses out of the air bag, especially when the air bag is deployed to its pre-impact deployed volume since such a pre-impact deployment requires to maintain gas pressure during a longer period of time than a post-impact deployment of the air bag. For instance, the active ventilation can be controlled by passive pressure controlled silicone membranes, pyrotechnical release controlled devices, such as pyrotechnical controlled ventilation hatches or by means of trunk vents.

While the best mode for carrying out the invention has been described in detail, those familiar with the art to which this invention relates will recognize various alternative designs and embodiments for practicing the invention as defined by the following claims.

What is claimed:

1. An air bag deployment system for a vehicle comprising:
   at least one pre-impact sensor operative to detect an imminent impact;
   at least one post-impact sensor operative to detect an impact; and
   at least one air bag having a non-deployed volume, a pre-impact deployed volume, and a post-impact deployed volume, the pre-impact deployed volume being larger than the post-impact deployed volume; and
   a processing unit to determine, based on signals received from the at least one pre-impact sensor, a probability of the imminent impact by taking into account a pre-programmed scenario, the at least one air bag arranged in working cooperation with the processing unit such the deployment to the pre-impact deployed volume occurs when the probability of imminent impact is determined to be sufficiently high, and the at least one air bag arranged in working cooperation with the at least one post-impact sensor for deployment to the post-impact deployed volume in reaction to the impact being detected prior to the determination that the probability of imminent impact is sufficiently high.

2. The air bag deployment system according to claim 1, wherein the pre-impact and post-impact deployed volumes are regulated by means of a releasable restraining device, the releasable restraining device being arranged to restrain the at least one air bag from reaching the pre-impact deployed volume during deployment into the post-impact deployed volume.

3. The air bag deployment system according to claim 2, wherein the releasable restraining device is arranged to be released before impact, so that the at least one air bag can be deployed into the pre-impact deployed volume during the pre-impact deployment.

4. The air bag deployment system according to claim 3, wherein the releasable restraining device comprises at least one releasable tether.

5. The air bag deployment system according to claim 1, wherein the at least one pre-impact sensor is at least one of a radar sensor, a camera, and a laser sensor.

6. The air bag deployment system according to claim 1, further comprising at least one of an accelerometer, a roll over sensor, a brake sensor, and an occupant positioning sensor.

7. The air bag deployment system according to claim 1, further comprising means for active ventilation of the air bag to control a duration of deployment in the pre-impact deployed volume.

8. A method for operating an occupant protection system for a vehicle, comprising the steps of:
   operating at least one pre-impact sensor and at least one post-impact sensor;
   operating a processing unit receiving inputs from the at least one pre-impact sensor and taking into account a pre-programmed scenario to determine a probability of an imminent impact;
   if the probability of an imminent impact is determined to be sufficiently high, deploying at least one air bag to a pre-impact deployed volume; and
   if an impact is detected by the at least one post-impact sensor prior to the probability of an imminent impact causing deployment to the pre-impact deployed volume, deploying the at least one air bag to a post-impact deployed volume smaller than the pre-impact deployed volume.

9. The method according to claim 8, wherein the method further comprises the step of:
   releasing a releasable restraining device to enable the at least one air bag to be deployed into the pre-impact deployed volume.

10. The method according to claim 9 wherein the releasable restraining device comprises at least one tether and in that the method comprises the step of:
    releasing the at least one tether to enable the at least one air bag to be deployed into the pre-impact deployed volume.

11. A method for operating an occupant protection system for a vehicle, comprising the steps of:
    detecting a radar echo by means of a long range radar sensor to determine an inbounding object's relative speed and distance;
    determining at least one of a type and a size of the object by means of a camera;
    operating at least one post-impact sensor;

operating a processing unit receiving inputs from the long range radar sensor and the camera to detect an imminent impact and determine whether or not conditions for deployment of an air bag to a pre-impact deployed volume are fulfilled; and if an impact is detected by the at least one post-impact sensor prior to detection of the imminent impact by the pre-impact sensor, deploying the at least one air bag to a post-impact deployed volume smaller than the pre-impact deployed volume.

12. The method according to claim 11, wherein the at least one pre-impact sensor further comprises a laser sensor and the method further comprises the step of:

determining the relative speed and distance of the object by means of the laser sensor.

13. The method according to claim 12, wherein the method comprises the step of:

operating the processing unit to use relative speed and distance inputs from the laser sensor in replacement of at least a portion of inputs from the long range radar sensor when the object is within an effective range of the laser sensor.

14. The method according to claim 8, further comprising the step of:

actively ventilating the at least one airbag to control a duration time of deployment to the pre-impact deployed volume.

* * * * *